(12) United States Patent
Yamamoto

(10) Patent No.: US 11,734,098 B2
(45) Date of Patent: Aug. 22, 2023

(54) COMPUTER-READABLE RECORDING MEDIUM STORING FAILURE CAUSE IDENTIFICATION PROGRAM AND METHOD OF IDENTIFYING FAILURE CAUSE

(71) Applicant: FUJITSU LIMITED, Kawasaki (JP)

(72) Inventor: Masao Yamamoto, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 37 days.

(21) Appl. No.: 17/368,899

(22) Filed: Jul. 7, 2021

(65) Prior Publication Data
US 2022/0075678 A1    Mar. 10, 2022

(30) Foreign Application Priority Data
Sep. 9, 2020    (JP) ................... 2020-151392

(51) Int. Cl.
*G06F 11/07*    (2006.01)
*G06F 9/455*    (2018.01)

(52) U.S. Cl.
CPC ........ *G06F 11/079* (2013.01); *G06F 9/45537* (2013.01); *G06F 11/076* (2013.01); *G06F 11/0712* (2013.01); *G06F 11/0778* (2013.01)

(58) Field of Classification Search
CPC .. G06F 11/079; G06F 11/0712; G06F 11/076; G06F 11/0778
See application file for complete search history.

(56) References Cited

U.S. PATENT DOCUMENTS

| 10,367,711 | B2* | 7/2019 | Desai | H04L 43/20 |
| 2003/0056200 | A1* | 3/2003 | Li | G06F 11/323 |
| | | | | 714/E11.181 |
| 2018/0210801 | A1* | 7/2018 | Wu | H04L 43/08 |
| 2020/0341833 | A1* | 10/2020 | Poghosyan | G06F 11/301 |

FOREIGN PATENT DOCUMENTS

| JP | 2018-518762 A | 7/2018 |
| WO | 2016/191639 A1 | 12/2016 |

* cited by examiner

*Primary Examiner* — Jigar P Patel
(74) *Attorney, Agent, or Firm* — Fujitsu Patent Center

(57) ABSTRACT

A non-transitory computer-readable recording medium stores a failure cause identification program for causing a computer to execute a process including: collecting process information related to one or more processes that operate in a container environment; obtaining a derivative relationship of a process for each container on the basis of the process information; generating symbol information in which a function of each of the processes is associated with a container in which each of the processes operates according to the derivative relationship of the process for each container; generating an aggregation result in which a frequency of the function is aggregated according to the symbol information; and identifying a cause at a time of failure occurrence on the basis of the aggregation result.

8 Claims, 18 Drawing Sheets

FIG. 5

```
PID    PPID   PROCESS
 875      1   CONTAINER MANAGEMENT PROGRAM  (EXAMPLE: /usr/bin/containerd)
3061    875   ¥_ CONTAINER MAIN BODY PROGRAM  (EXAMPLE: containerd-shim)
3090   3061   |    ¥_ bash
12543  3061   |    ¥_ bash
12983  12543  |        ¥_ himeno.exe
3191    875   ¥_ CONTAINER MAIN BODY PROGRAM  (EXAMPLE: containerd-shim)
3221   3191   |    ¥_ bash
12946  3191   |    ¥_ bash
12981  12946  |        ¥_ himeno.exe
3327    875   ¥_ CONTAINER MAIN BODY PROGRAM  (EXAMPLE: containerd-shim)
3356   3327        ¥_ bash
```

FIG. 7

| PID | PPID | CONTAINER NAME | PROCESS |
|---|---|---|---|
| 18898 | 18870 | test1 | /bin/bash |
| 19337 | 18898 | test1 | himeno.exe |
| 21024 | 19920 | test2 | /bin/bash |
| 21046 | 21024 | test2 | test.exe |
| ... | ... | ... | ... |
| ... | ... | ... | ... |

FIG. 14

| Total | ratio | pCPU0 | pCPU1 | pCPU2 | pCPU3 | |
|---|---|---|---|---|---|---|
| 58909 | 49.07 | 29393 | 29516 | 0 | 0 | [guestOS]::vm1 |
| 26007 | 21.66 | 0 | 0 | 26007 | 0 | [ctn2]:usr/bin/himeno::jacobi |
| 25977 | 21.64 | 0 | 0 | 0 | 25977 | usr/bin/himeno::jacobi |
| 3905 | 3.25 | 0 | 0 | 3905 | 0 | [ctn2]:usr/lib64/libc-2.28.so::memcpy |
| 3855 | 3.21 | 0 | 1 | 0 | 3854 | usr/lib64/libc-2.28.so::memcpy |
| 126 | 0.10 | 69 | 54 | 1 | 2 | native_write_msr |
| 103 | 0.09 | 46 | 57 | 0 | 0 | [kvm_intel]vmx_vcpu_run |
| ⋮ | | | | | ⋮ | |

FIG. 15

```
Total  ratio  vCPU0  vCPU1
26002  43.11    0    26002  usr/bin/himeno::jacobi
25899  42.94  25899    0    [ctn1]:usr/bin/himeno::jacobi
 3454   5.73    0     3454  usr/lib64/libc-2.28.so::memcpy
 3425   5.68   3425    0    [ctn1]:usr/lib64/libc-2.28.so::memcpy
 1109   1.84   613    495   [idle]::steal
   29   0.05    14     15   apic_timer_interrupt
                      ...
                      ...
```

FIG. 16

| Total | ratio | pCPU1 | pCPU2 | |
|---|---|---|---|---|
| 26007 | 86.63 | 0 | 26007 | [ctn2]:usr/bin/himeno::jacobi |
| 3905 | 13.01 | 0 | 3905 | [ctn2]:usr/lib64/libc-2.28.so::memcpy |
| 12 | 0.04 | 0 | 12 | prepare_exit_to_usermode |
| 12 | 0.04 | 0 | 12 | apic_timer_interrupt |
| 8 | 0.03 | 0 | 8 | _acct_update_integrals |
| 7 | 0.02 | 0 | 7 | irq_enter |
| 5 | 0.02 | 0 | 5 | swapgs_restore_regs_and_return_to_usermode |
| 4 | 0.01 | 0 | 4 | task_tick_fair |
| 4 | 0.01 | 0 | 4 | read_tsc |
| 3 | 0.01 | 0 | 3 | native_sched_clock |
| ... | ... | ... | ... | |
| 1 | 0.00 | 1 | 0 | usr/bin/docker-containerd-shim |

COMPUTER-READABLE RECORDING MEDIUM STORING FAILURE CAUSE IDENTIFICATION PROGRAM AND METHOD OF IDENTIFYING FAILURE CAUSE

CROSS-REFERENCE TO RELATED APPLICATION

This application is based upon and claims the benefit of priority of the prior Japanese Patent Application No. 2020-151392, filed on Sep. 9, 2020, the entire contents of which are incorporated herein by reference.

FIELD

The embodiment discussed herein is related to a failure cause identification program and a method of identifying a failure cause.

BACKGROUND

A container environment is used in a cloud computing system. The container environment is a computer infrastructure environment used in the cloud computing system. A container is an execution environment in which a logical partition is created in a host operating system (OS) and the runtime (library and middleware) required to operate an application is packaged as one together with the application.

Japanese Laid-open Patent Publication No. 2018-518762 is disclosed as related art.

SUMMARY

According to an aspect of the embodiments, a non-transitory computer-readable recording medium stores a failure cause identification program for causing a computer to execute a process including: collecting process information related to one or more processes that operate in a container environment; obtaining a derivative relationship of a process for each container on the basis of the process information; generating symbol information in which a function of each of the processes is associated with a container in which each of the processes operates according to the derivative relationship of the process for each container; generating an aggregation result in which a frequency of the function is aggregated according to the symbol information; and identifying a cause at a time of failure occurrence on the basis of the aggregation result.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 5 is an explanatory diagram illustrating a parent-child relationship between processes;

FIG. 7 is a diagram illustrating container name-PID map information;

FIG. 14 is a diagram illustrating an output of an analysis result of a host by a frequency output unit;

FIG. 15 is a diagram illustrating an output of an analysis result of a guest by the frequency output unit;

FIG. 16 is a diagram illustrating an output of a frequency-output-for-each-container-context unit;

DESCRIPTION OF EMBODIMENTS

Virtualization using containers does not include a guest OS as in hypervisor-type virtualization. Therefore, the host OS assumes a part of the process management function of the application process in the container, such as process scheduling. Accordingly, unlike the hypervisor-type virtualization, the application in the container has process ID (PID) in the host OS, which is a value different from PID in the container, and is enabled to directly access the process information of the PID in the host OS as host OS information. Note that the application in the container also has PID in the container in addition to the PID in the host OS to isolate the inside of the container from the host OS.

Here, in a case where abnormality occurs in the cloud computing system, tracing has been known as a technique of identifying a cause of the abnormality. For example, a resource usage status, data flow, and the like are collected for each container, central processing unit (CPU), memory, virtual switch, and the like, and in which component the problem has occurred is distinguished.

However, according to the tracing, it is difficult to distinguish whether the problem occurrence location is at the operating application in the container or it is a problem on the side of the environmental infrastructure, such as the host OS.

For example, the existing OS information (process information) alone may not distinguish between a process in the container and a process in the host OS, and process information obtained by accessing from the host OS is only process information in the host OS. Therefore, it is not possible to identify whether a process appearing in the host OS is a process in the container, and which container the process is in.

In one aspect, a failure cause identification program and a method of identifying a failure cause capable of distinguishing, in a case where abnormality occurs in a container environment of a cloud computing system, whether a problem has occurred in an operating application in a container or the problem is on an environmental infrastructure side such as a host OS side may be provided.

Hereinafter, an embodiment of a failure cause identification program and a method of identifying a failure cause disclosed in the present application will be described in detail with reference to the drawings. Note that the embodiment is not limited to the present embodiment. Furthermore, each embodiment may be appropriately combined within a range without inconsistency.

[Computer System]

Figure 1:
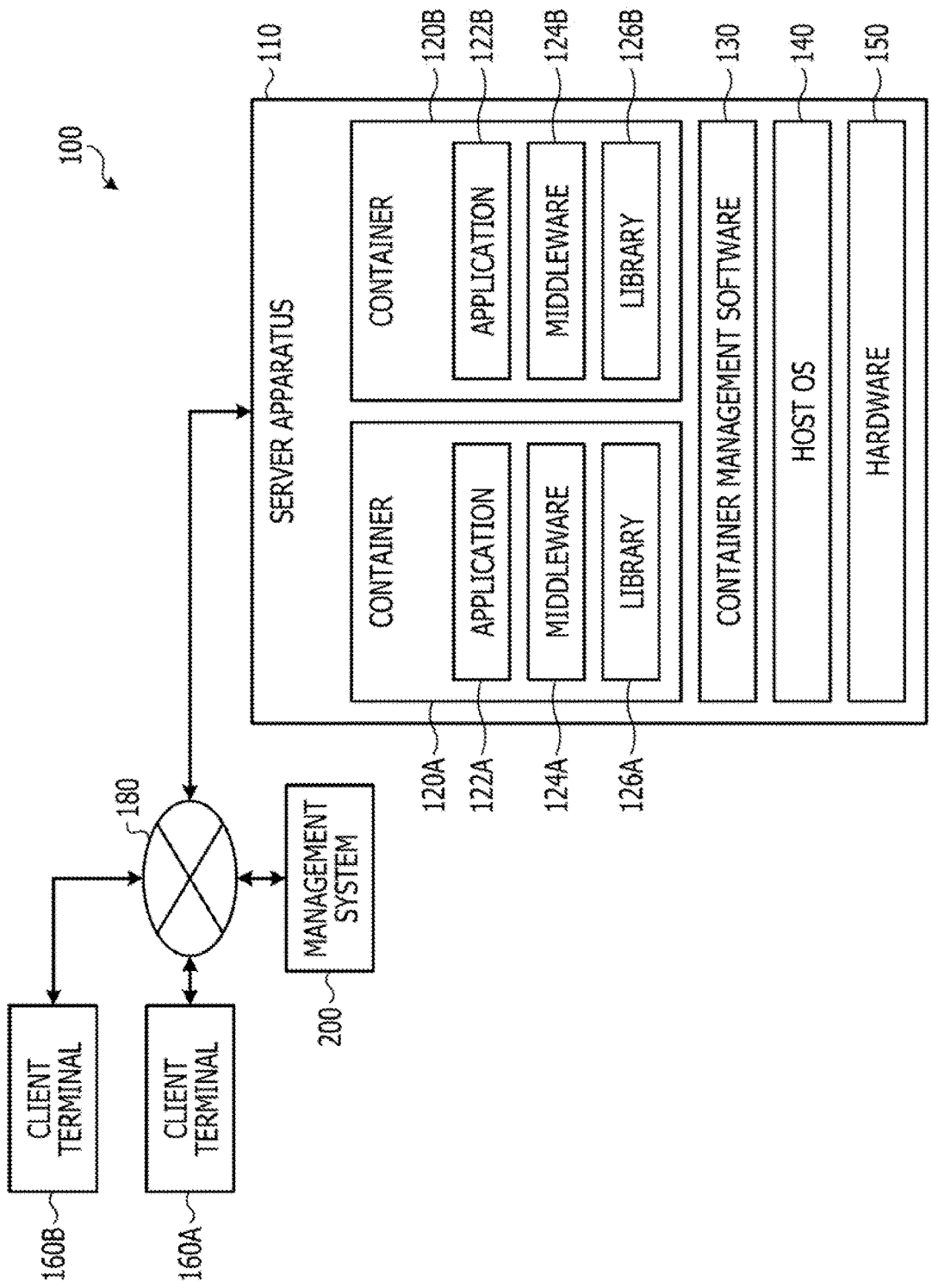
FIG. 1 is a schematic diagram of a computer system to which an embodiment according to the present disclosure is applied.

FIG. 1 is a schematic diagram of a computer system to which an embodiment according to the present disclosure is applied. As illustrated in FIG. 1, a computer system 100 includes one or more server apparatuses 110, one or more client terminals 160, a management system 200, and a network 180 that connects them to each other. Note that, in the case of indicating either a client terminal 160A or a client terminal 160B without specifying it, a reference sign 160 is used, and other reference signs are represented in the same format.

The server apparatus 110 runs an application, and provides an information service to a user of the computer system 100. The user uses the server apparatus 110 via the client terminal 160. The server apparatus 110 includes hardware required for running the application. Configurations of the server apparatuses 110 do not have to be the same, and different configurations may be provided depending on the respective uses.

The server apparatus 110 is a server apparatus that operates a container for the purpose of dynamically dividing or multiplexing a logical system configuration used by the application and the OS. As illustrated in FIG. 1, the server apparatus 110 includes a container 120, container management software 130, a host OS 140, and hardware 150. The container 120 is a virtual space created in such a manner that resources such as a CPU and a memory included in the hardware 150 are isolated with a kernel of the host OS 140 shared through the container management software 130. Note that the CPU of the hardware 150 of the server apparatus 110 includes a register called a performance monitoring counter (PMC) to be described later. A failure cause identification program according to the present disclosure instructs a driver in the OS kernel to obtain information associated with a process to be described later in accordance with an overflow interrupt generated when a counter of the PMC exceeds a set upper limit value. The failure cause identification program according to the present disclosure may be installed in the server apparatus 110 and executed by the server apparatus 110, or may be installed in the management system 200 to be described later, obtain information of the server apparatus 110 from the outside of server apparatus 110, and execute analysis of a failure cause in the management system 200.

An application 122, middleware 124, and a library 126 are included inside the container 120. The application 122 is a program that runs inside the container 120. The middleware 124 is software required to run the application 122. The middleware 124 is located between the host OS 140 and the application 122, and provides functions commonly used by various kinds of software. The library 126 is a reusable collection of multiple programs that are highly versatile.

The container is different from the virtualization technology in that, while a guest OS needs to be started in a virtual machine in the conventional virtualization technology such as the virtual machine, an application running environment may be created without starting a guest OS in the container. That is, for example, applications may be run with resources fewer than those of the virtual machine, whereby no extra memory or CPU resources are used.

The network 180 directly connects devices that communicate via wired communication or wireless communication to each other. The network 180 may include one or more network switches or routers (not illustrated) to form a plurality of communication paths. Furthermore, it may be physically or logically divided according to the role or the characteristics of data to be transmitted, and for the division, a general one in the conventional techniques may be used. For that purpose, a technique for logically dividing and multiplexing a network space, such as a virtual local area network (VLAN), may be used.

Note that networks (not illustrated) may be configured separately corresponding to the purpose of use, such as, for example, communication between the application (server apparatus 110) and the user (client terminal 160) is provided as a service network, and communication between the management system 200 and the server apparatus 110 is provided as a management network.

Generally, a cloud service employs a pay-per-use method for the use of those system areas themselves, the application environment created in the system areas, and the IT services provided by the application.

The management system 200 is for centrally managing the configuration and operating status of the server apparatus 110, and is mainly used by an administrator in charge of the operation management of the computer system 100. The management system 200 includes at least one computer that monitors the operating status of the server apparatus 110. Furthermore, the management system 200 may include a KVM switch. The KVM switch is a device that manages the operation of the server apparatus by connecting the main body of the KVM switch to console (keyboard, mouse, and monitor) ports of a plurality of server apparatuses to switch the operation target with a limited console. Furthermore, the management system 200 may also include a KVM extender capable of extending the console of the server apparatus. With the KVM extender used, the operation management room and the machine room of the server apparatus may be spatially separated. Furthermore, the management system 200 may include a console drawer, which is a device in which console functions of the server apparatus and KVM switch are integrated into a rack 1U size. With the console drawer used, the space used for the console may be integrated into a rack 1U size, and space saving may be achieved. Furthermore, since it can be stored in a rack, the safety of workers is secured.

By being connected to the network 180, the client terminal 160 is enabled to mutually communicate with the server apparatus 110. The user who uses the client terminal 160 can use the IT service provided by the server apparatus 110 by operating the client terminal 160. For example, the server apparatus 110 performs processing such as application running on the basis of a request by the user input to the client terminal 160, and outputs a result of the processing to the client terminal 160.

First Embodiment

Figure 2:
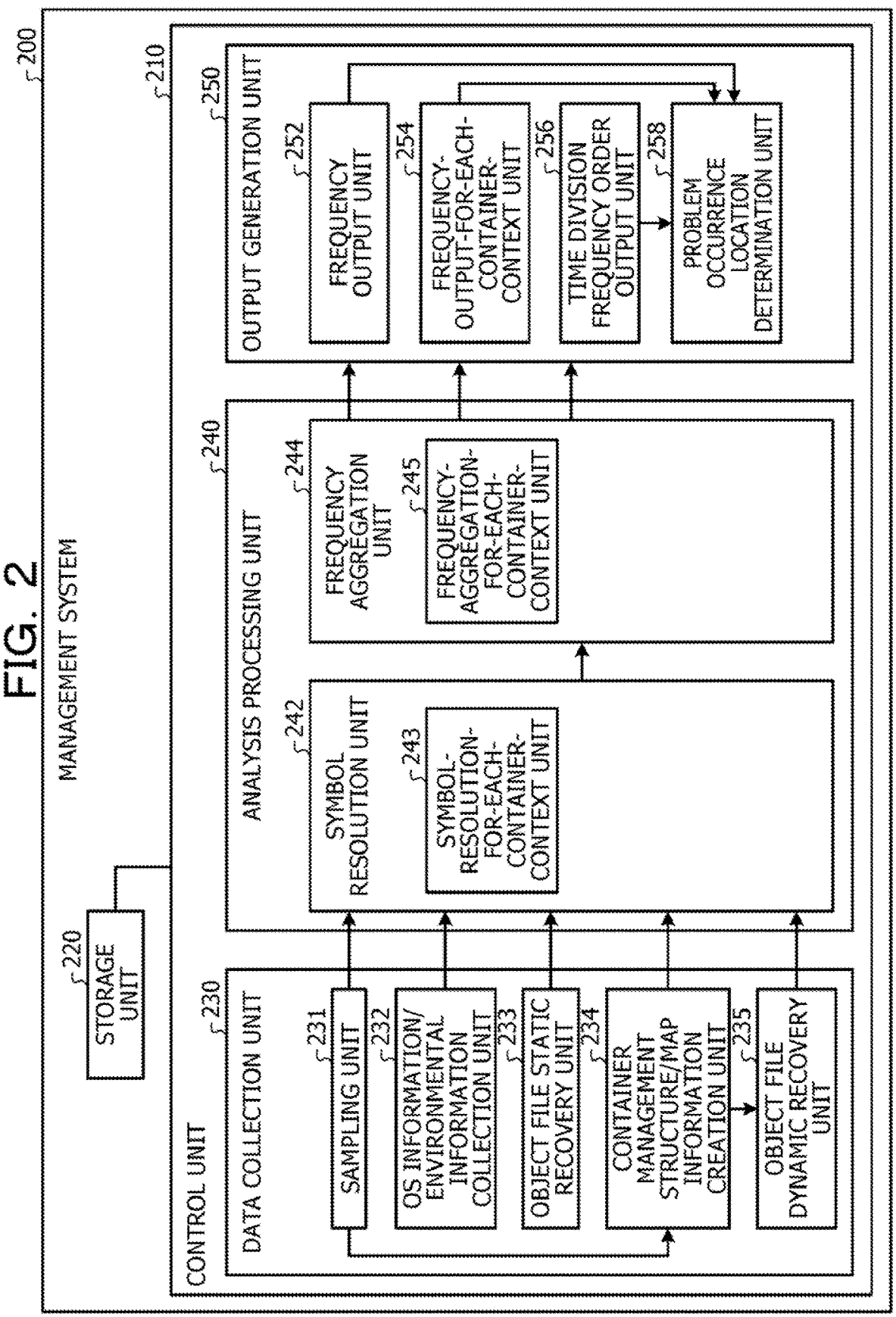
FIG. 2 is a functional block diagram of a management system according to the present disclosure.

FIG. 2 is a functional block diagram of a management system according to the present disclosure. A failure cause identification program according to the present disclosure may be installed and executed in a management system 200 illustrated in FIG. 1, or may be installed and executed in a server apparatus 110 of a computer system 100. As illustrated in FIG. 2, the management system 200 according to the present disclosure includes a control unit 210, a storage unit 220, a data collection unit 230, an analysis processing unit 240, and an output generation unit 250.

The control unit 210 is a processing unit that controls the entire management system 200, and is constructed by a processor such as a CPU, for example. The CPU includes a register called a performance monitoring counter (PMC). The PMC is a register that counts and accumulates activities related to hardware in the computer system 100. Furthermore, the CPU includes a register that sets a type of an event to be monitored by the PMC and an upper limit value of the counter.

An overflow interrupt occurs when the counter of the PMC exceeds the set upper limit value. The overflow interrupt activates a driver (sampling driver) in the OS kernel. Therefore, at the timing of being activated, the driver is enabled to collect various kinds of information such as ID of a running process (hereinafter referred to as PID value), ID of the parent process of the running process (hereinafter referred to as PPID value), a program counter (PC) that is a memory address of an instruction being executed (hereinafter referred to as instruction address), a value of other registers, and the like, for example. With the PMC used, it becomes possible to identify a problematic part using the program counter (PC) and also a type of the event that may be related to the cause of the problem.

The storage unit 220 stores a program to be executed by the control unit 210 or data to be processed by the control unit 210, and is constructed by a main storage device, an external storage device, or the like. The main storage device is constructed by, for example, a memory or the like such as a random access memory (RAM) and a read only memory (ROM), and the external storage device is constructed by a hard disk or a solid state drive (SSD).

Note that the storage unit 220 stores in advance a result of a performance profile of the server apparatus 110 at the normal time as data to be used for determination made by a problem occurrence location determination unit 258 to be described later.

[Data Collection Unit]

The data collection unit 230 includes a sampling unit 231, an OS information/environmental information collection unit 232, an object file static recovery unit 233, a container management structure/map information creation unit 234, and an object file dynamic recovery unit 235.

Figure 3:
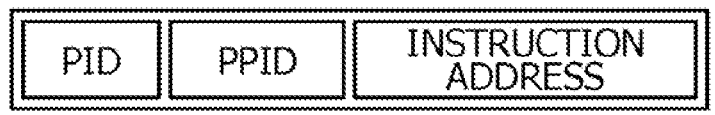
FIG. 3 is a diagram illustrating sampling data to be obtained by a sampling unit.

The sampling unit 231 uses the overflow interrupt when the counter of the PMC of the CPU included in the server apparatus 110 exceeds the set upper limit value to obtain, as sampling data, a PID value, a PPID value, and an instruction address, which are information capable of identifying the operation program at that time for each interrupt. FIG. 3 is a diagram illustrating sampling data to be obtained by the sampling unit 231. As illustrated in FIG. 3, the sampling unit 231 obtains, as sampling data, a PID value, a PPID value, and an instruction address. A collection cycle, which is a sampling interval of the sampling unit 231, and a collection time, which is a time to continue the sampling, may be optionally set. For example, the collection cycle may be set to 1 ms, and the collection time may be set to 30 seconds. The sampling unit 231 stores the obtained information in the storage unit 220.

The OS information/environmental information collection unit 232 obtains, as OS information, a PID value: program name: file path of an object file of a program in association with each other from the host OS 140. Therefore, the program name may be identified from the obtained PID value. Furthermore, since the file path of the object file of the program is associated with the PID value, it becomes possible to identify, from the obtained PID value, the file path of the object file, that is, for example, the existence location of the object file in the file system.

The object file static recovery unit 233 identifies, from the set information of the PID value: program name: file path of the object file of the program obtained by the OS information/environmental information collection unit 232 from the host OS 140 as the OS information, the file path of the object file of the program corresponding to the PID value, and copies and recovers the object file.

[Container Management Structure/Map Information Creation Unit]

Figure 4:
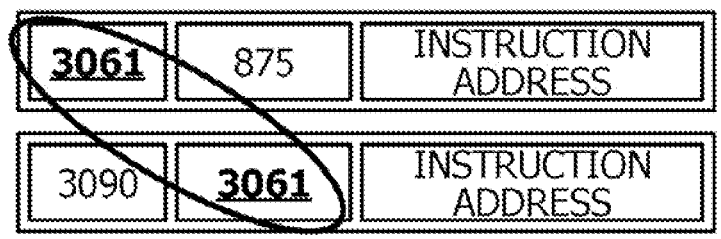
FIG. 4 is an explanatory diagram illustrating a parent-child relationship between sampling data.

The container management structure/map information creation unit 234 creates a tree of a parent-child relationship (derivative relationship) of process derivation on the basis of the PID value, PPID value, and instruction address, which are information capable of identifying the operation program obtained by the sampling unit 231. FIG. 4 is an explanatory diagram illustrating a parent-child relationship between sampling data. As illustrated in FIG. 4, in a case where a PID value in sampling data (3061 in the example of FIG. 4) matches a PPID value in another sampling data (3061 in the example of FIG. 4), there is a parent-child relationship between the processes indicated by the respective sampling data.

FIG. 5 is an explanatory diagram illustrating a parent-child relationship between processes. In a container environment, there is a tree structure of a parent-child relationship between processes having container management software as a root process. As illustrated in FIG. 5, the child process of the container management program corresponds to the container main body, and the grandchild process and subsequent processes correspond to application programs to be executed in the container. The container management structure/map information creation unit 234 generates a "container management structure" and "container name-PID map information" to be described later on the basis of a container management program name and its PID value.

Figure 6:
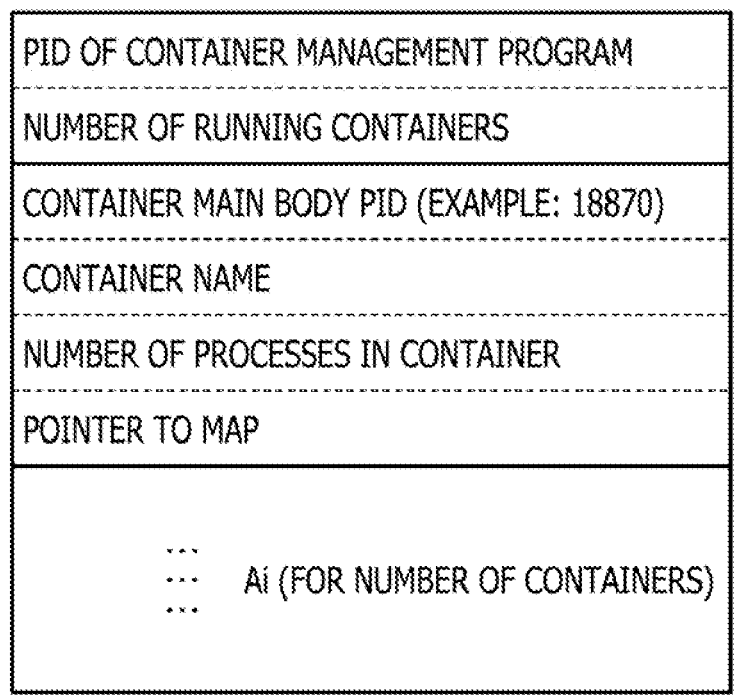
FIG. 6 is a diagram illustrating a container management structure.

FIG. 6 is a diagram illustrating a container management structure. As illustrated in FIG. 6, the "container management structure" is information that integrates information related to the container. Specifically, for example, the container management structure is information obtained by integrating, with respect to the PID of the container management program and the number of running containers, container main body PID for one container (one container context), a container name, the number of processes in the container, and a pointer to a map for the number of all containers.

FIG. 7 is a diagram illustrating container name-PID map information. As illustrated in FIG. 7, the "container name-PID map information" is information obtained by integrating, over all containers, information associated with a process having a PPID value that matches the PID value of a specific process as a set. The "container name-PID map information" will be described with reference to FIG. 7. For example, a process "/bin/bash" that operates in a container with a name "test1" has a PID value of 18898. Meanwhile, a PPID value of a process "himeno.exe" that operates in the same container "test1" is 18898, which matches the PID value 18898 of the process "/bin/bash". In this manner, in the "container name-PID map information", information associated with processes is integrated with a process having a PPID value that matches the PID value of a specific process being grouped.

Figure 8:
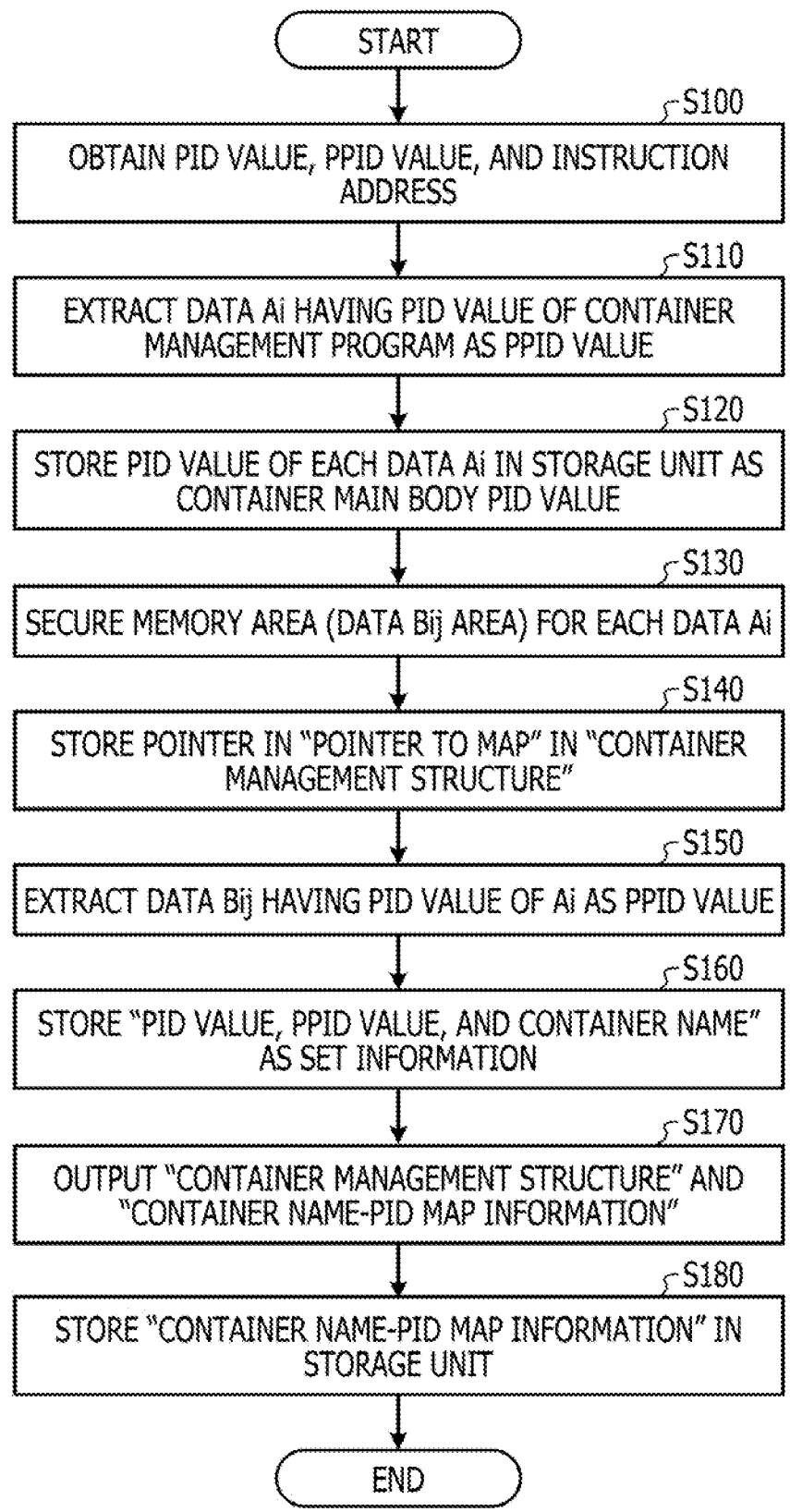
FIG. 8 is a flowchart illustrating a creation procedure for creating container management structure/map information.

FIG. 8 is a flowchart illustrating a creation procedure for creating container management structure/map information. A creation procedure of a container management structure will be described with reference to FIG. 8. The sampling unit 231 obtains sampling data (PID value, PPID value, and instruction address), which is information capable of identifying the operation program (step S100).

With the process information managed by the host OS 140 and the information capable of identifying the operation program obtained by the sampling unit 231 serving as input data, sampling data Ai (i=1, 2, . . . , n) having the PID value of the container management program as a PPID value is extracted from among them (step S110). The PID value of each sampling data Ai is stored in the storage unit 220 as "container main body PID" in the "container management structure" illustrated in FIG. 6 (step S120). Note that, in this step, the process information managed by the host OS 140 is main input, and the information capable of identifying the operation program obtained by the sampling unit 231 is auxiliary input. This is because there is a process that existed during data collection but has already terminated and does not exist at the time of collecting process information, and input information is for such a process. Note that the information capable of identifying the operation program is an example of program operation information.

Next, for each sampling data Ai, a memory area (i.e., data Bij area (j=1, 2, . . . , m)) for the "container name-PID map information" illustrated in FIG. 7 is secured (step S130). A pointer is recorded and retained in the "pointer to a map" of the corresponding Ai in the "container management structure" (step S140). Note that the pointer is for freely accessing the memory from the program.

Then, the data Bij (j=1, 2, . . . , m) having the PID value of Ai as a PPID value is extracted from the input data (step S150). The set information of "PID value, PPID value, and container name" is recorded and retained in the "container name-PID map information" as essentials (step S160). Note that, here, the information associated with the container name is obtained from the container management software. Furthermore, the process name included in the "container name-PID map information" illustrated in FIG. 7 is added at the time of a symbol resolution process to be described later.

Thereafter, steps S150 to S160 are repeated to generate a tree structure of the parent-child relationship of the process rooted in the container management program as a "container management structure" and "container name-PID value map information" (step S170). Of these, at least the "container name-PID map information" required for post-processing is stored in the main storage device of the storage unit 220 or an external storage device (step S180).

Figure 9:
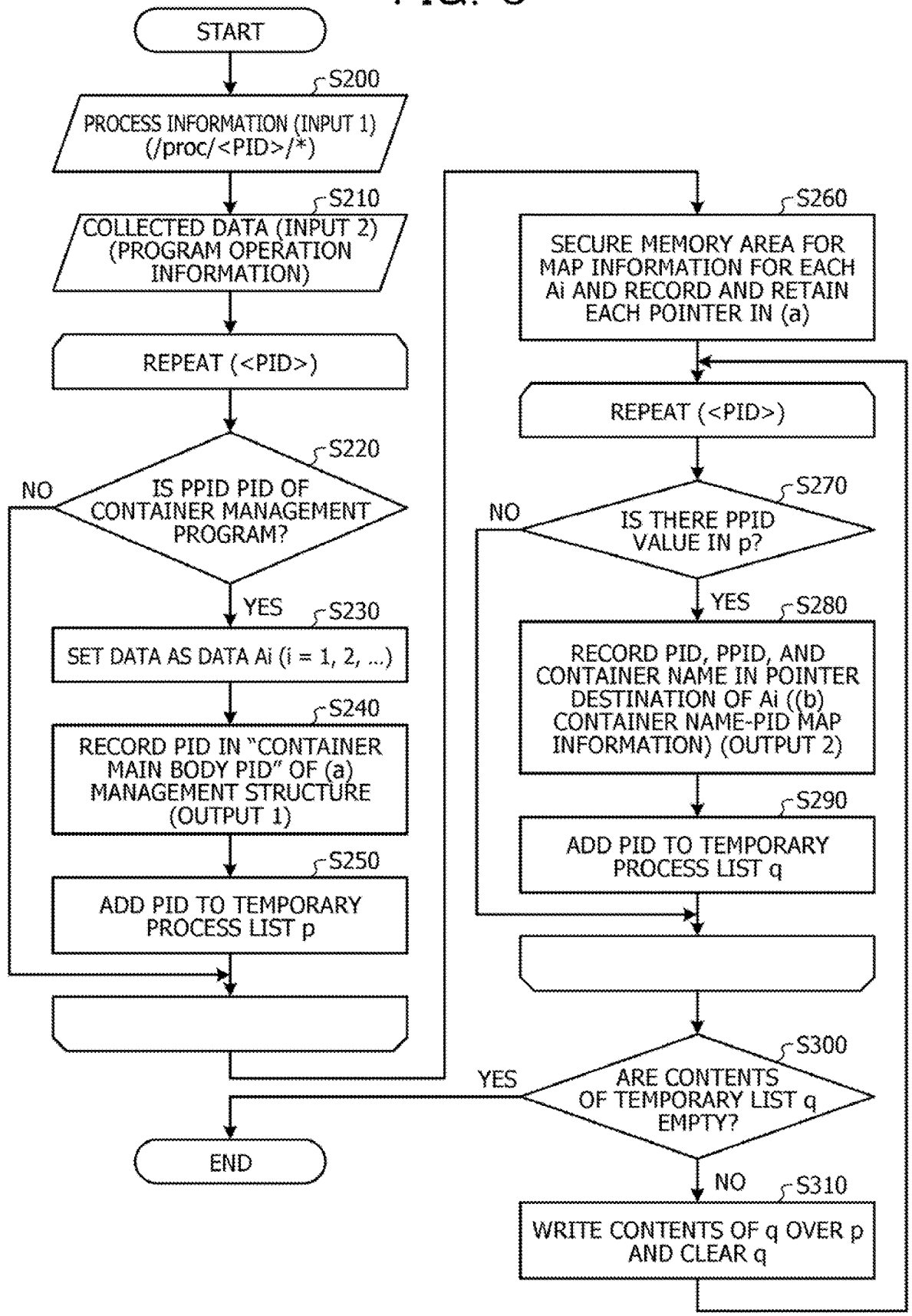
FIG. 9 is a flowchart illustrating a processing procedure of a program for creating container management structure/map information.

FIG. 9 is a flowchart illustrating a processing procedure of a program for creating a container management structure/map information. A processing procedure of a program that implements the container management structure/map information creation unit 234 will be described with reference to FIG. 9. Process information is obtained (step S200). Operation program information is obtained (step S210).

It is determined whether the PPID value is the PID value of the container management program (step S220). If the PPID value of the process is the PID value of the container management program (YES in step S220), the data having the PID value of the container management program as a PPID value is set as data Ai (i=1, 2, . . . ) (step S230). The PID value is recorded in the "container main body PID" of the container management structure (step S240). The PID value is added to a temporary process list p (step S250). Steps S220 to S250 are repeatedly executed for all the obtained PID values.

If it is determined in step S220 that the PPID value is not the PID value of the container management program (NO in step S220), steps S230 to S250 are not executed, and steps S220 to S250 are executed for the next PID value.

When execution of the process of steps S220 to S250 is complete for all the obtained PID values, for each data Ai (i=1, 2, . . . ), a memory area for map information is secured, and a pointer corresponding to the secured memory area is recorded in the container management structure (step S260).

It is determined whether there is a PPID value in the temporary process list p (step S270). If there is a PPID value in the temporary process list p (YES in step S270), the PID, PPID, and the container name are recorded in the "container name-PID map information", which is the pointer destination of the data, as set information (step S280). The PID is added to a temporary process list q (step S290). Steps S270 to S290 are repeatedly executed for all the obtained PIDs.

When execution of the process of steps S270 to S290 is complete for all the obtained PIDs, it is determined whether the contents of the temporary list q are empty (step S300). If the contents of the temporary list q are empty (YES in step S300), the process is terminated. If the contents of the temporary list q are not empty (NO in step S300), the temporary list p is overwritten with the contents of the temporary list q, and then the temporary list q is deleted (step S310). Steps S270 to S300 are repeated until the contents of the temporary list q becomes empty.

[Object File Dynamic Recovery Unit]

The object file dynamic recovery unit 235 recovers the object file at the timing of container disappearance. It is difficult to grasp the timing of container disappearance itself from the outside of the container management software as the transition to the disappearance state is file deletion. In view of the above, the object file dynamic recovery unit 235 recovers the object file according to the procedure illustrated in FIG. 10.

Figure 10:
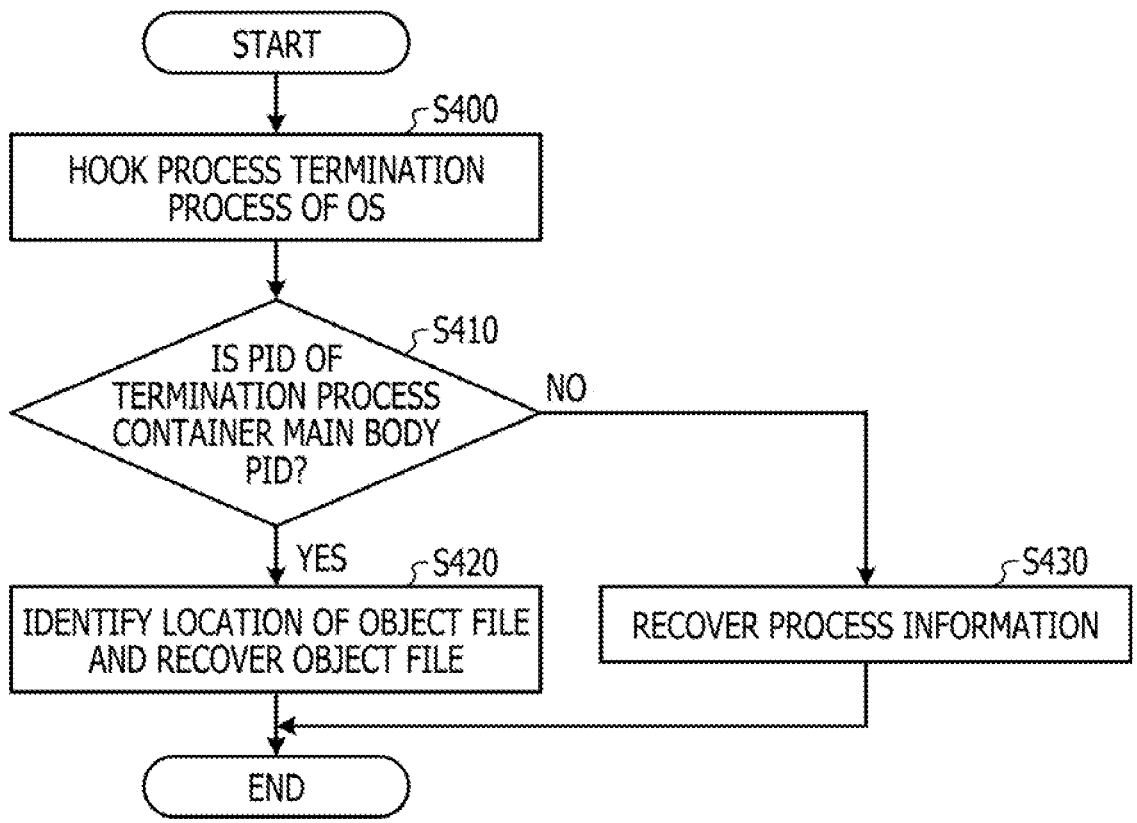
FIG. 10 is a flowchart illustrating a process of an object file dynamic recovery unit.

FIG. 10 is a flowchart illustrating a process of the object file dynamic recovery unit. A process of the object file dynamic recovery unit 235 will be described with reference to FIG. 10. A process termination process of the host OS 140 is hooked (step S400). Note that hooking is to steal a program process or an event generated in the process. After the process termination process of the host OS 140 is hooked, it is determined whether the PID value of the termination process is the PID value of the container main body registered in the process management structure of the container management software (step S410). If the PID value of the termination process is the PID value of the container main body registered in the process management structure of the container management software (YES in step S410), the location of the object file is identified from the process information of the process in the container, and the object file is recovered (step S420). Note that the recovering is carried out from the inside of the container to the host OS using the function of the container management software. If the PID value of the termination process is not the PID value of the container main body registered in the process management structure of the container management software (NO in step S410), only the process information is collected (step S430).

In this manner, according to the object file dynamic recovery unit 235, the process termination process is hooked even if there is a disappeared container at the time of obtaining sampling data, whereby the object file having existed in the container may be collected. Accordingly, even if there is a disappeared container at the time of obtaining sampling data, performance profiling for each container context is made possible. Therefore, it becomes possible to easily identify the location of abnormality occurrence.

[Analysis Processing Unit]

As illustrated in FIG. 2, the analysis processing unit 240 includes a symbol resolution unit 242 and a frequency aggregation unit 244. In addition, the symbol resolution unit 242 includes a symbol-resolution-for-each-container-context unit 243, and the frequency aggregation unit 244 includes a frequency-aggregation-for-each-container-context unit 245.

The symbol resolution unit 242 executes symbol resolution on the basis of the data collected by the data collection unit 230. Here, a symbol is a process name or a name identifier such as a program name to be executed in the process, a function name in the program, or a variable name. Symbol resolution indicates, for example, associating or converting identification information (e.g., PID, register value, instruction address, etc.) for the CPU, OS, or the like to identify the processing target with or into the process name or the name identifier in the program. For example, with the symbol resolution executed, it becomes possible to associate the sampling data with the process name or the name identifier in the program.

With the symbol resolution of the sampled data executed, the user is enabled to determine where the abnormality is present from the analysis result of the sampled data. However, the symbol resolution takes time as it includes a process of searching for a correspondence relationship between an instruction address and a symbol, for example.

The symbol-resolution-for-each-container-context unit 243 executes symbol resolution for each container context. Note that the container context indicates a series of processes to be called and executed from the container space (same as a normal user process when viewed from the host OS). The container context also includes processing (system call processing, etc.) in the host OS to be executed as an extension of the processing of the application executed in the container. Multiple processes (contexts) belonging to the same container are assumed to be the same container context.

Figure 11:
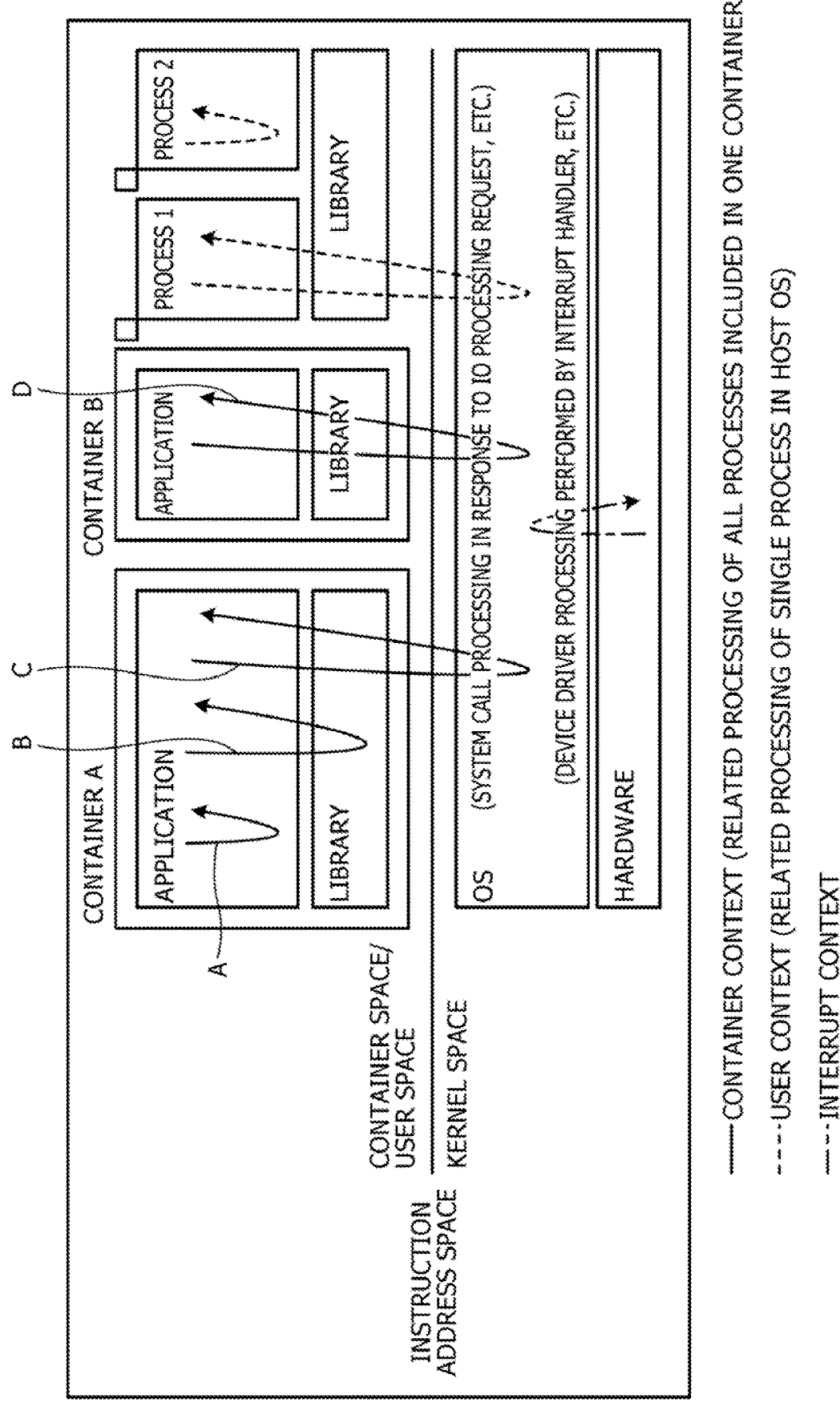
FIG. 11 is an explanatory diagram illustrating a container context.

FIG. 11 is an explanatory diagram illustrating a container context. As illustrated in FIG. 11, a container context is a series of processes to be executed in relation to the application executed in the container. For example, in a process C illustrated in FIG. 11, a library is called from the application, and the OS is called from the library to execute the process. Since a plurality of processes belonging to the same container are the same container context, processes A, 8, and C illustrated in FIG. 11 are the same container context.

Figure 12:
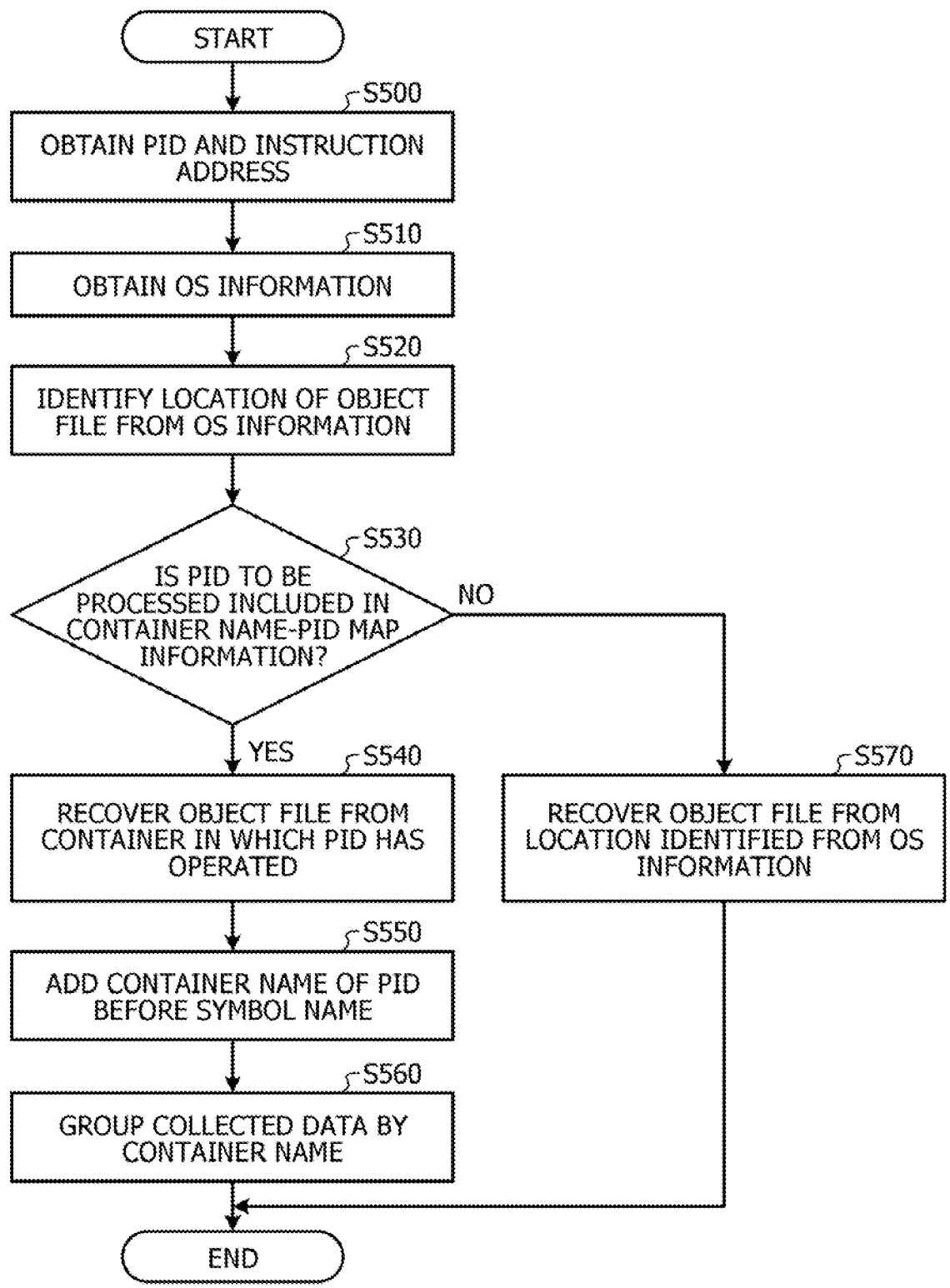
FIG. 12 is a flowchart illustrating a process of a symbol-resolution-for-each-container-context unit.

FIG. 12 is a flowchart illustrating a process of the symbol-resolution-for-each-container-context unit. A process of the symbol-resolution-for-each-container-context unit 243 will be described with reference to FIG. 12. Note that a process in which a subject is not the symbol-resolution-for-each-container-context unit 243 is also described and explained in the flowchart. A process in which a subject is not the symbol-resolution-for-each-container-context unit 243 may also be included in the process of the symbol-resolution-for-each-container-context unit 243.

The sampling unit 231 obtains the PID, PPID, and instruction address (step S500). The OS information/environmental information collection unit 232 obtains, as OS information, set information of the PID: program name: file path of the object file of the program from the host OS 140 (step S510). Therefore, the symbol-resolution-for-each-container-context unit 243 is enabled to identify the program name from the PID by referring to those pieces of information.

The symbol-resolution-for-each-container-context unit 243 identifies, from the OS information, the file path of the object file, that is, for example, the existence location in the file system (step S520). The symbol-resolution-for-each-container-context unit 243 refers to the "container name-PID map information", and determines whether the PID to be processed is included in the "container name-PID map information" (step S530).

If the PID to be processed is included in the "container name-PID map information" (YES in step S530), the symbol-resolution-for-each-container-context unit 243 recovers the object file corresponding to the PID to be processed from the container in which the PID obtained from the "container name-PID map information" has operated (step S540). When the object file is recovered, the symbol-resolution-for-each-container-context unit 243 adds, before the symbol name, the container name of the PID obtained from the map information as a name of the container in which the symbol (function) has operated (step S550). For example, in a case where a container name is ctn1 and a function name is foo, it is output as a symbol "ctn1::foo". When the container name is added before the symbol name, the symbol-resolution-for-each-container-context unit 243 groups the collected data by the container name (step S560).

If the PID to be processed is not included in the "container name-PID map information" (NO in step S530), the symbol-resolution-for-each-container-context unit 243 recovers the object file from the location identified from the OS information in step S520 (step S570).

As described above, the symbol-resolution-for-each-container-context unit 243 is enabled to associate a function name with the instruction address in each sampling data. Furthermore, since the symbol-resolution-for-each-container-context unit 243 outputs data by grouping them by container names, analysis for each container context is made possible.

The frequency aggregation unit 244 aggregates the frequency in a function unit on the basis of the function name associated with the instruction address by the symbol resolution unit 242. This makes it possible to know in which process in the program the performance event used for the counting has occurred frequently. For example, it becomes possible to know which process in the program consumes a lot of CPU time and which process instruction has been executed frequently.

The frequency-aggregation-for-each-container-context unit 245 executes frequency aggregation for the result of the symbol resolution for each container context executed by the symbol-resolution-for-each-container-context unit 243. Therefore, according to the frequency-aggregation-for-each-container-context unit 245, it becomes possible to grasp the frequency of the process even for a series of processes performed as an extension of the processing performed in the container.

[Output Generation Unit]

As illustrated in FIG. 2, the output generation unit 250 includes a frequency output unit 252, a frequency-output-for-each-container-context unit 254, a time division frequency order output unit 256, and a problem occurrence location determination unit 258.

The frequency output unit 252 outputs, in the order of frequency, the aggregation result obtained by aggregating the frequency using the frequency aggregation unit 244 with respect to the data in which the function name is associated with the instruction address on the basis of the sampling data using the symbol resolution unit 242.

Figure 13:
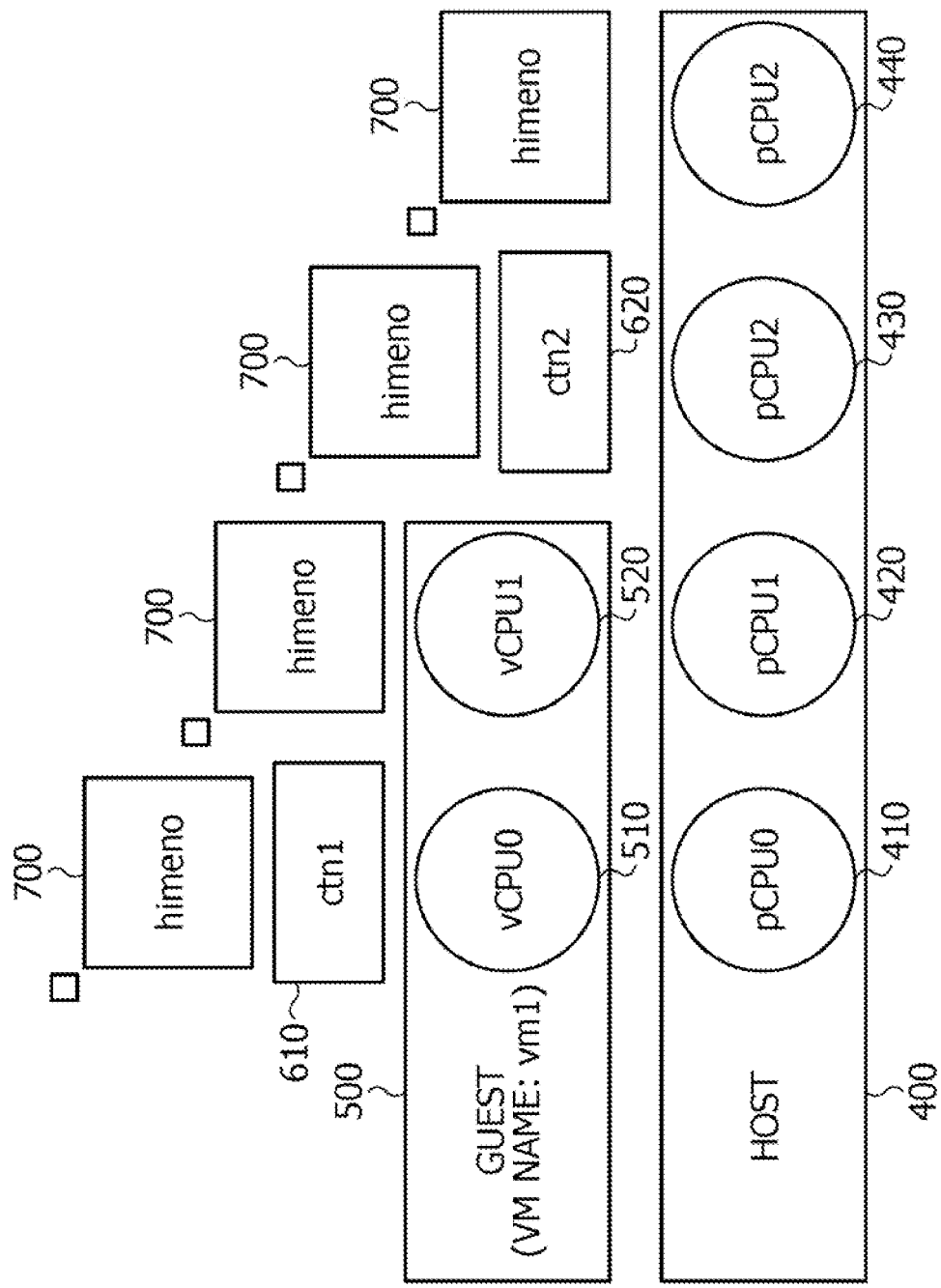
FIG. 13 is a schematic diagram illustrating a virtual environment to be subject to sampling.

The output of the frequency output unit 252 will be described using a specific example. FIG. 13 is a schematic diagram illustrating a virtual environment to be sampled. As illustrated in FIG. 13, the virtual environment includes four physical CPUs (pCPU0_410, pCPU1_420, pCPU2_430, and pCPU3_440) in a host 400. A virtual CPU (vCPU0_510) is assigned to a virtual machine 500 using the physical CPU (pCPU0_410) of the host 400, and a virtual CPU (vCPU1_520) is assigned using the physical CPU (pCPU1_420). Furthermore, a container (ctn1_610) is constructed using the virtual CPU (vCPU0_510), and a container (ctn2_620) is constructed using the physical CPU (pCPU2_430). As illustrated in FIG. 13, an application (himeno_700) is bound to the following four execution environments and executed. (1) Container (ctn1_610) constructed in the virtual CPU (vCPU0_510) operating in the physical CPU (pCPU0_410); (2) Virtual CPU (vCPU1_520) operating in the physical CPU (pCPU1_420); (3) Container (ctn2_620) constructed in the physical CPU (pCPU2_430); and (4) Physical CPU (pCPU3_430).

FIG. 14 is a diagram illustrating an output of an analysis result of the host by the frequency output unit. An output of the frequency output unit 252 will be described with reference to FIG. 14. In FIG. 14, the sampling unit 231 displays, in descending order of frequency, results of execution of symbol resolution and frequency aggregation with respect to data sampled with a collection cycle of 1 ms and a collection time of 30 seconds. A number displayed under "Total" in FIG. 14 indicates the number of data sampling of each function displayed at the right end in FIG. 14 over the entire host. A number displayed under "ratio" in FIG. 14 indicates the operation ratio of each function displayed at the right end in FIG. 14 over the entire host. A number displayed under the letters "pCPU0", "pCPU1", "pCPU2", and "pCPU3" in FIG. 14 indicates the number of data sampling of each function displayed at the right end in FIG. 14 in each physical CPU of pCPU0, pCPU1, pCPU2, and pCPU3.

Referring to FIG. 14, for example, it is understood that "himeno" executed in the container (ctn2) has an operation ratio of 21.66% over the entire host from the numbers displayed on the left side of "[ctn2]:usr/bin/himeno::jacobi". Furthermore, it is understood that the processing of "himeno" executed in the container (ctn2) is executed only in pCPU2 among the four physical CPUs included in the host 400, and the number of data sampling in pCPU2 is 26007.

With the output of the analysis result of the host by the frequency output unit 252 checked in this manner, it becomes possible to grasp in which function the processing is the most concentrated in the entire host.

FIG. 15 is a diagram illustrating an output of an analysis result of a guest by the frequency output unit. In a similar manner to FIG. 14, in FIG. 15, results of execution of symbol resolution and frequency aggregation with respect to data sampled with a collection cycle of 1 ms and a collection time of 30 seconds are displayed in descending order of frequency. A number displayed under "Total" in FIG. 15 indicates the number of data sampling of each function displayed at the right end in FIG. 15 over the entire guest.

A number displayed under "ratio" in FIG. 15 indicates the operation ratio of each function displayed at the right end in FIG. 15 over the entire guest. In FIG. 15, a number displayed under "vCPU0" and "vCPU1" indicates the number of data sampling of each function displayed at the right end in FIG. 15 in each virtual CPU of vCPU0 and vCPU1.

Referring to FIG. 15, for example, it is understood that "himeno" executed in the container (ctn1) has an operation ratio of 42.94% over the entire guest from the numbers displayed on the left side of "[ctn1]:usr/bin/himeno::jacobi".

With the output of the analysis result of the guest by the frequency output unit 252 checked in this manner, it becomes possible to grasp in which function the processing is the most concentrated in the entire guest.

The frequency-output-for-each-container-context unit 254 outputs, in the order of frequency, a result of frequency aggregation for each container context performed by the frequency-aggregation-for-each-container-context unit 245 with respect to the result of the symbol resolution for each container context performed by the symbol-resolution-for-each-container-context unit 243.

FIG. 16 is a diagram illustrating a frequency output of frequency aggregation for each container context of the container (ctn2). At the right end in FIG. 16, each of the displayed "[ctn2]:usr/bin/himeno::jacobi" and "[ctn2]:usr/lib64/libc-2.28.so::memcpy", in which a container name is added before a function name, is a function of an application executed in the container. Furthermore, the displayed functions from "prepare_exite_to_usermode" to "native_sched_clock" displayed under the application functions executed in the container, which are displayed at the right end in FIG. 16, are kernel functions of the host OS having operated as an extension of the processing of the container. Furthermore, "usr/bin/docker-containerd-shim" displayed at the lower right end in FIG. 16 is a container main body program.

In this manner, with the results output by the frequency-output-for-each-container-context unit 254 for the aggregation result of the frequency-aggregation-for-each-container-context unit 245 checked, it becomes possible to grasp, even for the series of processes operated as an extension of the processing performed in the container, the frequencies of the processes.

As described with reference to FIGS. 14, 15, and 16, the frequency output unit 252 is capable of outputting a result of frequency aggregation performed for each host, each guest, and each container for which the sampling data has been obtained. Therefore, with the output of the frequency output unit 252 checked, in a case where abnormality occurs, it becomes possible to efficiently narrow down the location where the abnormality has occurred.

The time division frequency order output unit 256 divides the entire collection time in which the sampling unit 231 collect sampling data at a predetermined time interval, and outputs the result of frequency aggregation at the predetermined time interval in a time series.

With the time-series data output by the time division frequency order output unit 256 checked, it becomes possible to detect a change in performance that has been temporarily generated or abnormality.

The problem occurrence location determination unit 258 compares the output result of the frequency output unit 252 or the frequency-output-for-each-container-context unit 254 with the result of the performance profile at the normal time to determine abnormality.

Figure 17:
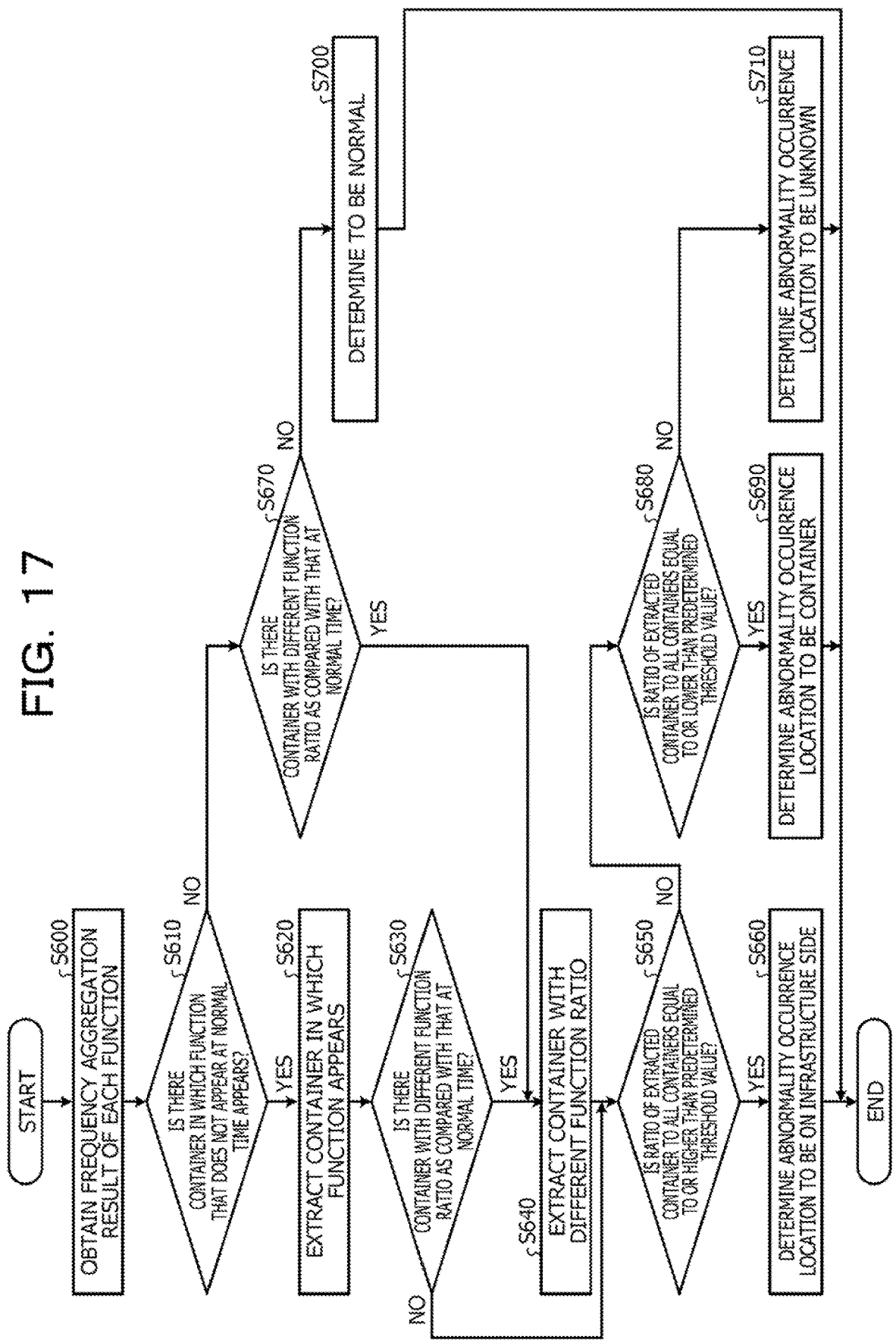
FIG. 17 is a flowchart illustrating a procedure of a process of a problem occurrence location determination unit.

FIG. 17 is a flowchart illustrating a procedure of a process of the problem occurrence location determination unit. A process of the problem occurrence location determination unit 258 will be described with reference to FIG. 17. The aggregation result of the frequency of each function for each container context aggregated by the frequency aggregation unit 244 is obtained (step S600). It is determined whether there is a function that does not appear in the result of the performance profile at the normal time stored in the storage unit 220 in the obtained aggregation result of the frequency of each function (step S610). If there is a function that does not appear in the result of the performance profile at the normal time (YES in step S610), the container in which the function appears is extracted (step S620). Next, the obtained aggregation result of the frequency of each function is compared with the result of the performance profile at the normal time to determine whether there is a container with a different function ratio (step S630). Here, whether or not there is a container with a different function ratio may be determined on the basis of whether or not there is a function having a predetermined difference in the operation ratio as compared with that at the normal time among the functions executed in the container. For example, in a case where there is a container in which a function with an operation ratio different from that at the normal time by 15 points or more exists, the container may be determined to be a container with a different function ratio. If there is a container with a different function ratio (YES in step S630), the container with a different function ratio is extracted (step S640). When the container with a different function ratio is extracted, it is determined whether the ratio of the extracted container to all containers is equal to or higher than a predetermined threshold value (step S650). Here, the predetermined threshold value of the ratio of the extracted container to all the containers in step S650 may be, for example, 90% or more. If the ratio of the extracted container to all the containers is equal to or higher than the predetermined threshold value (YES in step S650), the cause of the abnormality is determined to be a problem on the infrastructure side (step S660).

If there is no function that does not appear in the result of the performance profile at the normal time (NO in step S610), the obtained aggregation result of the frequency of each function is compared with the result of the performance profile at the normal time to determine whether there is a container with a different function ratio (step S670). If there is a container with a different function ratio (YES in step S670), the container with a different function ratio is extracted (step S640).

If there is no container with a different function ratio in step S670 (NO in step S670), it is determined to be normal (step S700).

If the ration of the extracted container to all the containers is not equal to or higher than the predetermined threshold value in step S650 (NO in step S650), it is determined whether the ratio of the extracted container to all the containers is equal to or lower than a predetermined threshold value (step S680). Here, the predetermined threshold value of the ratio of the extracted container to all the containers in step S680 may be, for example, 10% or less. If the ratio of the extracted container to all the containers is equal to or lower than the predetermined threshold value (YES in step S680), it is determined that the location where the abnormality has occurred is on the container side (step S690).

If the ratio of the extracted container to all the containers is not equal to or lower than the predetermined threshold value in step S680 (NO in step S680), it is determined that the location where the abnormality has occurred is unknown (step S710).

In this manner, the problem occurrence location determination unit 258 compares the result of the performance profile for each container context with the result of the performance profile at the normal time, thereby determining whether abnormality has occurred, and in a case where abnormality has occurred, whether the location where the abnormality has occurred is on the infrastructure side or on the container side, or whether the location where the abnormality has occurred is unknown. Therefore, it becomes possible to distinguish, in a container environment of a cloud computing system, whether a problem has occurred in an operating application in a container or the problem is on the host OS side or the like.

Next, a process of the management system 200 in which the failure cause identification program according to the present disclosure is installed will be described in the following order. 1. Acquisition of sampling data; 2. Creation of a container management structure and container name-PID value map information; 3. Dynamic recovery of an object file; 4. Symbol resolution for each container context; 5. Frequency aggregation for each container context; 6. Frequency output for each container context; 7. Determination of a problem occurrence location 1. Acquisition of Sampling Data The management system 200 obtains sampling data from the server apparatus 110 via the sampling unit 231. After the sampling data is obtained, the OS information/environmental information collection unit 232 obtains, as OS information, set information of the PID: program name: file path of the object file of the program from the host OS 140. After the OS information is obtained, the object file static recovery unit 233 identifies, from the PID value obtained as the OS information, the file path of the object file of the program corresponding to the PID value, and copies and recovers the object file.

2. Creation of Container Management Structure and Container Name-PID Value Map Information When the acquisition of the sampling data is complete, the management system 200 creates a container management structure and container name-PID map information. The creation procedure of the container management structure and the container name-PID map information is as described above, and thus descriptions thereof will be omitted.

3. Dynamic Recovery of Object File

The management system 200 recovers the object file of the disappeared container via the object file dynamic recovery unit 235 at the timing of the container disappearance.

4. Symbol Resolution for Each Container Context

The management system 200 executes symbol resolution for each container context via the symbol-resolution-for-each-container-context unit 243 using the sampling data and object file collected by the data collection unit 230. The symbol resolution for each container context is as described above, and thus descriptions thereof will be omitted.

5. Frequency Aggregation for Each Container Context

When the symbol resolution for each container context is complete, the management system 200 performs frequency aggregation for each container context via the frequency-aggregation-for-each-container-context unit 245. The frequency aggregation for each container context is as described above, and thus descriptions thereof will be omitted.

6. Frequency Output for Each Container Context

When the frequency aggregation for each container context is complete, the management system 200 outputs, via the frequency-output-for-each-container-context unit 254, the result of the frequency aggregation for each container context in the order of frequency.

7. Determination of Problem Occurrence Location

When the frequency output for each container context is complete, the management system 200 compares, via the problem occurrence location determination unit 258, the result of the frequency output for each container context with the result of the performance profile at the normal time stored in the storage unit 220 to determine the problem occurrence location. The determination of the problem occurrence location is as described above, and thus descriptions thereof will be omitted.

As described above, according to the management system 200 in which the failure cause identification program according to the present disclosure is installed, it becomes possible to distinguish, in the container environment of the cloud computing system, whether the problem has occurred in the operating application in the container or the problem is on the side of the environmental infrastructure such as the side of the host OS.

[Numerical Values, Etc.]

The number of servers and the like used in the embodiment described above are merely examples, and may be optionally changed.

[System]

Pieces of information including a processing procedure, a control procedure, a specific name, various types of data, and parameters described above or illustrated in the drawings may be optionally changed unless otherwise specified.

In addition, each component of each device illustrated in the drawings is functionally conceptual and does not necessarily have to be physically configured as illustrated in the drawings. For example, specific forms of distribution and integration of each device are not limited to those illustrated in the drawings. That is, for example, all or a part thereof may be configured by being functionally or physically distributed or integrated in optional units according to various types of loads, usage situations, or the like.

Moreover, all or any part of individual processing functions performed in each device may be implemented by a CPU and a program analyzed and executed by the CPU, or may be implemented as hardware by wired logic.

[Hardware Configuration]

Figure 18:
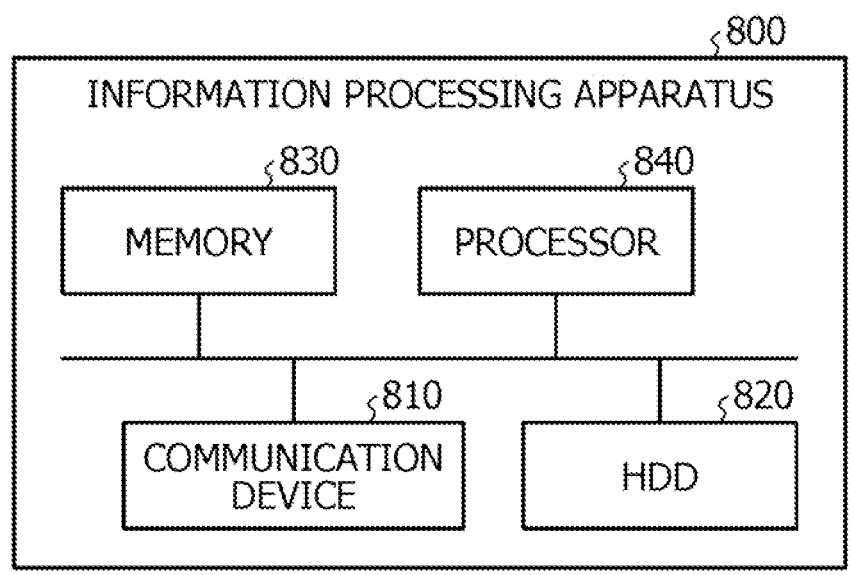
FIG. 18 is a diagram illustrating an exemplary hardware configuration.

FIG. 18 is a diagram illustrating an exemplary hardware configuration. As illustrated in FIG. 18, an information processing apparatus 800 includes a communication device 810, a hard disk drive (HDD) 820, a memory 830, and a processor 840. Furthermore, each of the units illustrated in FIG. 18 is mutually connected by a bus or the like.

The communication device 810 is a network interface card or the like, and communicates with other devices. The HDD 820 stores databases (DBs) and programs that activate the functions illustrated in FIG. 2.

The processor 840 reads a program that executes processing similar to that of each processing unit illustrated in FIG. 2 from the HDD 820 or the like, and loads it in the memory 830, thereby activating a process that implements each function described with reference to FIG. 2 or the like. For example, this process implements a function similar to that of each processing unit included in the information processing apparatus 800. Specifically, for example, the processor 840 reads a program having a function similar to those of the data collection unit 230, the analysis processing unit 240, the output generation unit 250, or the like from the HDD 820 or the like. Then, the processor 840 executes a process that performs processing similar to that of the data collection unit 230, the analysis processing unit 240, the output generation unit 250, and the like.

As described above, the information processing apparatus 800 operates as an information processing apparatus that executes a method of identifying a failure cause by reading and executing a program. Furthermore, the information processing apparatus 800 may also implement a function similar to that of the embodiment described above by reading, using a medium reading device, the program described above from a recording medium, and executing the read program. Note that the program referred to in other embodiments is not limited to being executed by the information processing apparatus 800. For example, the embodiment may be similarly applied to a case where another computer or server executes the program, or a case where these cooperatively execute the program.

This program may be distributed via a network such as the Internet. Furthermore, this program may be recorded in a computer-readable recording medium such as a hard disk, flexible disk (FD), compact disc read only memory (CD-ROM), magneto-optical disk (MO), or digital versatile disc (DVD), and may be executed by being read from the recording medium by a computer.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium storing a failure cause identification program for causing a computer to execute a process comprising:

collecting, at a host operating system (OS) in which a container operates, process information related to one or more processes that operate in the host operating system;

obtaining a derivative relationship of a process in the host operating system for each process of the container in the host operating system based on the process information;

generating symbol information in which a function which is executed in each of the processes is associated with a container in which each of the processes operates according to the derivative relationship of the process for each container;

generating, as an operation ratio of the computer, an aggregation result in which a frequency in which the function is executed is aggregated for each function according to the symbol information; and identifying a cause at a time of failure occurrence based on the function and the operation ratio.

2. The non-transitory computer-readable recording medium storing the failure cause identification program according to claim 1, wherein the collecting includes collecting, at a regular interval, program operation information associated with one or more operation programs that operate in a container, the program operation information including information associated with a parent program that has activated each of the operation programs, the obtaining includes obtaining the derivative relationship of the process based on the process information and the program operation information, and the generating includes generating the aggregation result for each container context that is a series of processes to be called from one container and executed.

3. The non-transitory computer-readable recording medium storing the failure cause identification program according to claim 2, wherein the generating includes: for a process included in the derivative relationship of the process, recovering an object file from a container that executes the process, and for a process not included in the derivative relationship of the process, recovering an object file from an operating system; and identifying the function of each of the processes using the object file of each of the processes and generating the symbol information using the identified function.

4. The non-transitory computer-readable recording medium storing the failure cause identification program according to claim 3, the program for causing the computer to execute the process further comprising: obtaining each object file related to each process that operates in the container at a timing when the container disappears.

5. The non-transitory computer-readable recording medium storing the failure cause identification program according to claim 4, wherein the obtaining includes: monitoring a process execution status of an operating system; hooking a termination process in which the operating system completes execution; and obtaining an object file of the termination process before the execution of the termination process is terminated.

6. The non-transitory computer-readable recording medium storing the failure cause identification program according to claim 2, wherein the generating includes generating an aggregation result at a normal time that is the frequency of the function for each of the container context at a normal operation time of the host operating system and an aggregation result at an abnormal time that is the frequency of the function for each of the container context at the time of failure occurrence of the host operating system, and the identifying includes comparing the aggregation result at the normal time with the aggregation result at the abnormal time and identifying the cause at the time of failure occurrence.

7. The non-transitory computer-readable recording medium storing the failure cause identification program according to claim 6, wherein the identifying further includes: comparing the aggregation result at the normal time with the aggregation result at the abnormal time and extracting a container with a different appearing function or a container with a different appearing function ratio; calculating a ratio of the extracted container to all containers; and identifying to be a failure on a container side in a case where the ratio is less than a threshold value and identifying to be a failure on an infrastructure side that provides the host operating system in a case where the ratio is equal to or higher than the threshold value.

8. A method of identifying a failure cause comprising:
collecting, by a computer, at a host operating system (OS) in which a container operates, process information related to one or more processes that operate in the host operating system;
obtaining a derivative relationship of a process in the host operating system for each process of the container in the host operating system based on the basis of the process information;
generating symbol information in which a function which is executed in each of the processes is associated with a container in which each of the processes operates according to the derivative relationship of the process for each container;
generating, as an operation ratio of the computer, an aggregation result in which a frequency in which the function is executed is aggregated for each function according to the symbol information; and
identifying a cause at a time of failure occurrence based on function and the operation ratio.

* * * * *